(12) United States Patent
Suh et al.

(10) Patent No.: US 7,699,086 B2
(45) Date of Patent: Apr. 20, 2010

(54) APPARATUS AND METHOD FOR ARRANGING A SPACER

(75) Inventors: Duck-Jong Suh, Seoul (KR); Yong-Kuk Yun, Suwon-si (KR); Baek-Kyun Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 11/456,701

(22) Filed: Jul. 11, 2006

(65) Prior Publication Data

US 2007/0033897 A1 Feb. 15, 2007

(30) Foreign Application Priority Data

Jul. 25, 2005 (KR) .................... 10-2005-0067237

(51) Int. Cl.
  *B32B 37/00* (2006.01)
(52) U.S. Cl. .................................. 156/498; 156/580.1
(58) Field of Classification Search ............... 156/73.1, 156/498, 555, 578, 580.1, 580.2, 582, 583.1
See application file for complete search history.

(56) References Cited

U.S. PATENT DOCUMENTS 6,710,843 B2 * 3/2004 Choo et al. ................. 349/187
2004/0112858 A1 6/2004 Yang

* cited by examiner

*Primary Examiner*—James Sells
(74) *Attorney, Agent, or Firm*—H.C. Park & Associates, PLC (57) ABSTRACT

An apparatus for arranging a spacer includes a substrate, a roller, and an adhesion unit. The substrate includes a recessed portion. A spacer, which maintains a cell gap of a display panel and has an adhesive member formed thereon, is received in the recessed portion. The roller corresponds to the spacer. The roller makes contact with an exposed portion of the adhesive member. The adhesion unit provides for an adhesive strength between the exposed portion of the adhesive member and the roller that exceeds an adhesive strength between the received portion of the adhesive member and the recessed portion of the substrate so that the spacer may be printed on the roller. Therefore, a cell gap uniformity of a display device may be improved.

17 Claims, 10 Drawing Sheets

APPARATUS AND METHOD FOR ARRANGING A SPACER

CROSS REFERENCE TO RELATED APPLICATION

The present application claims priority from and the benefit of Korean Patent Application No. 10-2005-0067237, filed on Jul. 25, 2005, the disclosure of which is hereby incorporated herein by reference in its entirety.

BACKGROUND OF THE INVENTION

1. Field of the Invention

The present invention relates to an apparatus for arranging a spacer and a method of arranging the spacer. More particularly, the present invention relates to an apparatus for arranging a spacer on a display substrate and a method of arranging the spacer.

2. Discussion of the Background

Generally, display devices such as liquid crystal displays (LCD), organic light emitting displays (OLED), etc., include a display panel for displaying an image and a circuit board for applying driving signals to the display panel.

The LCD includes two substrates having electrodes, respectively, a liquid crystal layer interposed between the substrates, and a spacer for maintaining a cell gap between the substrates. The cell gap is a distance between the substrates.

The spacer may be formed on the substrate using a dispersing process or a photo process. In the photo process, a photoresist layer is formed on the substrate and patterned to form the spacer.

When the spacer is formed using the dispersing process, it is formed in a pixel region of the substrate, thereby deteriorating an image display quality. When the spacer is formed using the photo process, the number of steps in the photo process is increased. The photo process includes steps of forming, exposing, and developing the photoresist layer, etc.

A printing process has been developed to print the spacer on the substrate. In particular, the spacer is printed on a printing roller and then printed on the substrate. Therefore, the printing process may be simpler than the photo process.

However, some of the spacers may not be printed on the printing roller, which may deteriorate cell gap uniformity.

SUMMARY OF THE INVENTION

The present invention provides an apparatus for arranging a spacer on a display substrate.

The present invention also provides a method of arranging a spacer on a display substrate.

Additional features of the invention will be set forth in the description which follows, and in part will be apparent from the description, or may be learned by practice of the invention.

The present invention discloses an apparatus for arranging a spacer on a substrate. The apparatus includes a substrate, a roller, and an adhesion unit. The substrate includes a recessed portion that receives the spacer, which has an adhesive member formed thereon. The adhesive member includes an exposed portion and a received portion. The roller corresponds to the spacer, and adheres with the exposed portion of the adhesive member. The adhesion unit provides for an adhesive strength between the exposed portion of the adhesive member and the roller that exceeds an adhesive strength between the received portion of the adhesive member and the recessed portion of the substrate so that the spacer may be printed on the roller.

The present invention also discloses a method for arranging a spacer. A spacer and an adhesive member formed thereon are aligned on a substrate that includes a recessed portion. An adhesive strength is provided between an exposed portion of the adhesive member that is protruded from the recessed portion and a roller corresponding to the spacer that is stronger than an adhesive strength between a received portion of the adhesive member and the recessed portion of the substrate. The spacer and the adhesive member are printed on the roller. The received portion of the adhesive member is attached to a display substrate to print the spacer on the display substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Apparatus for Arranging Spacer

The apparatus for arranging the spacer includes a substrate, a roller, and an adhesion unit.

The substrate includes a plurality of recessed portions. The spacer, which maintains a cell gap between two display panel substrates, and an adhesive member formed on the spacer may be arranged in the recessed portions.

The size of the recessed portions may be determined according to the size of the spacer. For example, the size of the spacer may be greater than a depth of the recessed portions so that the spacer partially protrudes from a surface of the substrate. Alternatively, the size of the spacer may be no more than the depth of the recessed portions. The adhesive member includes an exposed portion, which protrudes from the surface of the substrate, and a received portion, which is received in the recessed portions.

The roller corresponds to the spacer, and it contacts the exposed portion of the adhesive member.

The adhesion unit provides for a relatively stronger adhesion between the exposed portion of the adhesive member and the roller than between the received portion of the adhesive member and the recessed portion of the substrate so that the spacer in the recessed portions may be securely printed on a printing unit.

Figure 1:
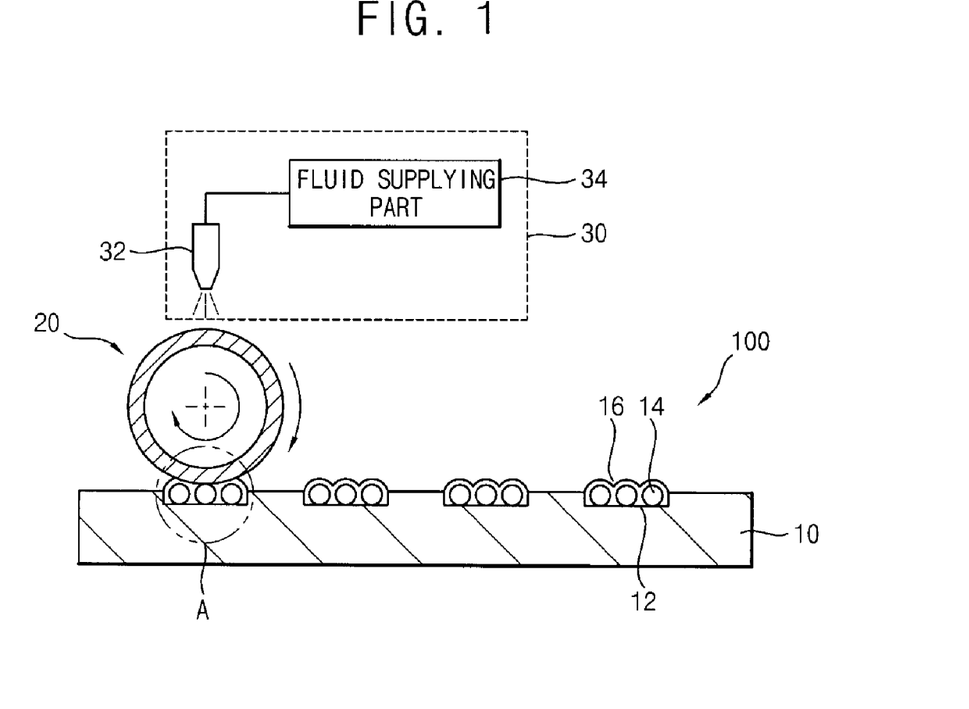
FIG. 1 is a cross-sectional view showing an apparatus for arranging a spacer in accordance with an exemplary embodiment of the present invention.
Figure 2:
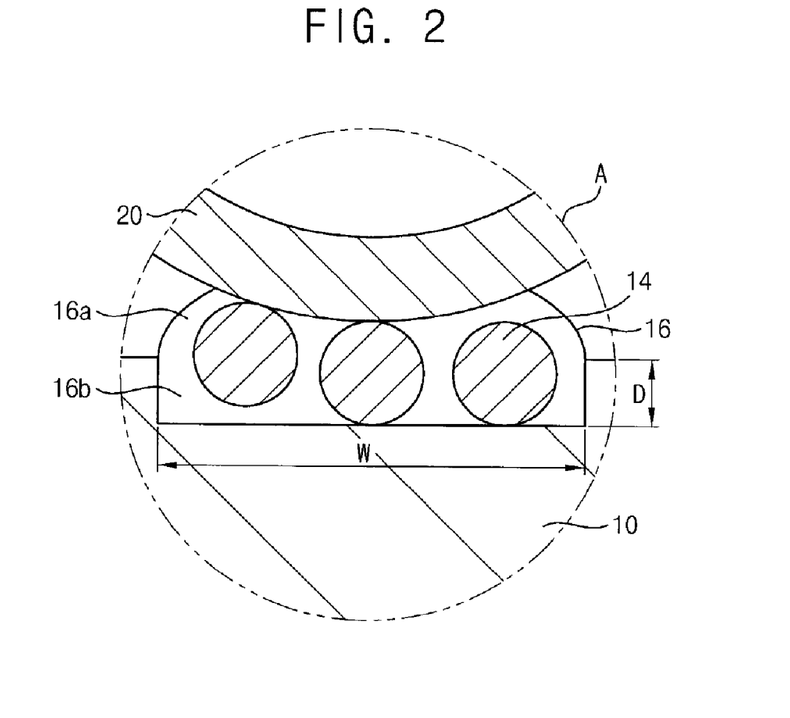
FIG. 2 is an enlarged cross-sectional view showing portion 'A' of FIG. 1.

FIG. 1 is a cross-sectional view showing an apparatus for arranging a spacer in accordance with an exemplary embodiment of the present invention, and FIG. 2 is an enlarged cross-sectional view showing portion 'A' of FIG. 1.

Referring to FIG. 1 and FIG. 2, the apparatus 100 for arranging the spacer includes a substrate 10, a roller 20 and an adhesion unit 30.

The substrate 10 may have a substantially plate shape. A plurality of recessed portions 12 are formed on the substrate 10. Each recessed portion 12 is recessed from a surface of the substrate 10, and at least one spacer 14 may be arranged in each recessed portion 12. A width W and a depth D of the recessed portions 12 may be determined by the number and size of the spacer 14, respectively. For example, the depth D may be less than the size of the spacer 14. Alternatively, the depth D may be greater than the size of the spacer 14.

In FIG. 1 and FIG. 2, the depth D of each of the recessed portions 12 is less than the size of the spacer 14. However, if the depth D was greater than the size of the spacer 14, an adhesive member 16, which is formed on the spacer 14, should still partially protrude from the surface of the substrate 10.

The adhesive member 16 includes an exposed portion 16a that protrudes from the surface of the substrate 10 and a received portion 16b that is received in the recessed portion 12.

The roller 20 corresponds to the surface of the substrate 10 having the spacer 14. For example, the roller 20 may have a substantially cylindrical shape, and it may include a synthetic resin that adheres with the adhesive member 16 that covers the spacer 14. The roller 20 makes contact with the exposed portion 16a of the adhesive member 16 or the spacer 14 so that the spacer 14 may be printed on the roller 20.

Figure 3:
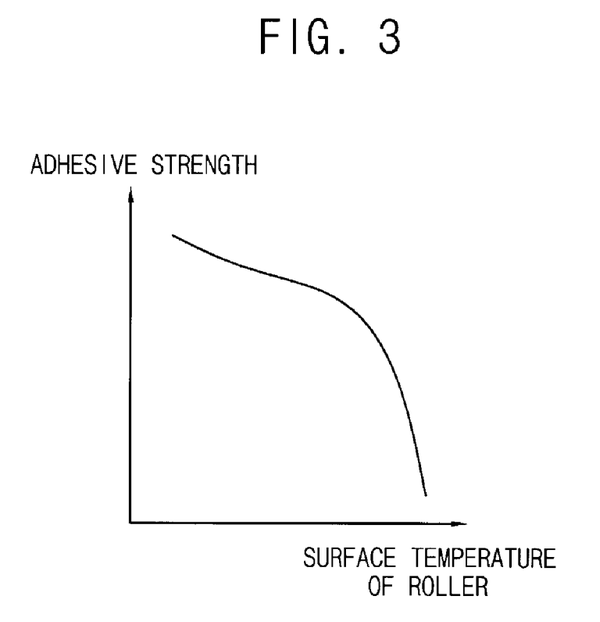
FIG. 3 is a graph showing a relationship between an adhesive strength and a surface temperature of a roller.
Figure 4:
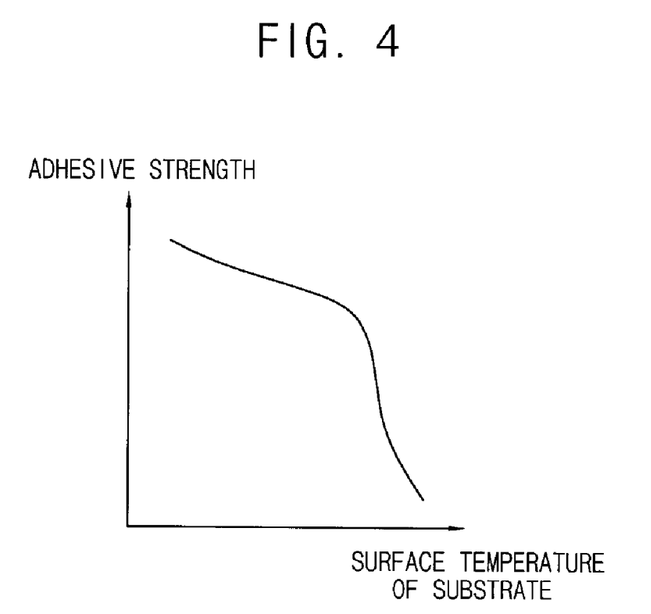
FIG. 4 is a graph showing a relationship between an adhesive strength and a surface temperature of a substrate.

FIG. 3 is a graph showing a relationship between an adhesive strength and a surface temperature of a roller, and FIG. 4 is a graph showing a relationship between an adhesive strength and a surface temperature of a substrate.

Referring to FIG. 1, FIG. 2, FIG. 3, and FIG. 4, as the surface temperature of the roller 20 increases, the adhesive strength between the roller 20 and the exposed portion 16a of the adhesive member 16 decreases. Similarly, as the surface temperature of the recessed portion 12 increases, the adhesive strength between the recessed portion 12 and the received portion 16b of the adhesive member 16 decreases.

Conversely, as the surface temperature of the roller 20 decreases, the adhesive strength between the roller 20 and the exposed portion 16a of the adhesive member 16 increases. Similarly, as the surface temperature of the recessed portion 12 decreases, the adhesive strength between the recessed portion 12 and the received portion 16b of the adhesive member 16 increases.

In order to print the spacer 14 in the recessed portion 12 on the roller 20, the adhesive strength between the roller 20 and the exposed portion 16a should be greater than the adhesive strength between the recessed portion 12 and the received portion 16b. Therefore, according to exemplary embodiments of the present invention, the adhesive strength between the roller 20 and the exposed portion 16a may be increased so that it exceeds the adhesive strength between the recessed portion 12 and the received portion 16b, and/or the adhesive strength between the recessed portion 12 and the received portion 16b may be decreased so that it is less than the adhesive strength between the roller 20 and the exposed portion 16a.

The adhesion unit 30 increases the adhesive strength between the roller 20 and the exposed portion 16a so that the spacer 14 that is received in the recessed portions 12 may be printed on the roller 20. In order to increase the adhesive strength between the roller 20 and the exposed portion 16a, the adhesion unit 30 decreases the surface temperature of the roller 20.

In particular, the adhesion unit 30 includes a spraying part 32 and a fluid supplying part 34. For example, the spraying unit 32 may be an air knife. The fluid supplying part 34 may further include a cooler (not shown) that decreases a temperature of a fluid such as an inert gas. Alternatively, the cooler (not shown) may be formed on the spraying part 32 or a conduit that connects the spraying part 32 and the fluid supplying part 34.

Examples of the inert gas that may be supplied by the fluid supplying part 34 include nitrogen, argon, helium, etc. They may be used alone or as a mixture thereof.

The fluid, such as the inert gas, from the fluid supplying part 34 is sprayed onto the roller 20 through the spraying part 32 to decrease the temperature of the roller 20. A temperature difference between the surface of the roller 20 and each of the recessed portions 12 may be about 5° C. to about 35° C.

When the inert gas decreases the surface temperature of the roller 20, the adhesive strength between the roller 20 and the exposed portion 16a of the adhesive member 16 may be greater than that between the recessed portions 12 and the received portion 16b of the adhesive member 16 so that the spacer 14 in the recessed portion 12 may be printed on the roller 20.

Figure 5:
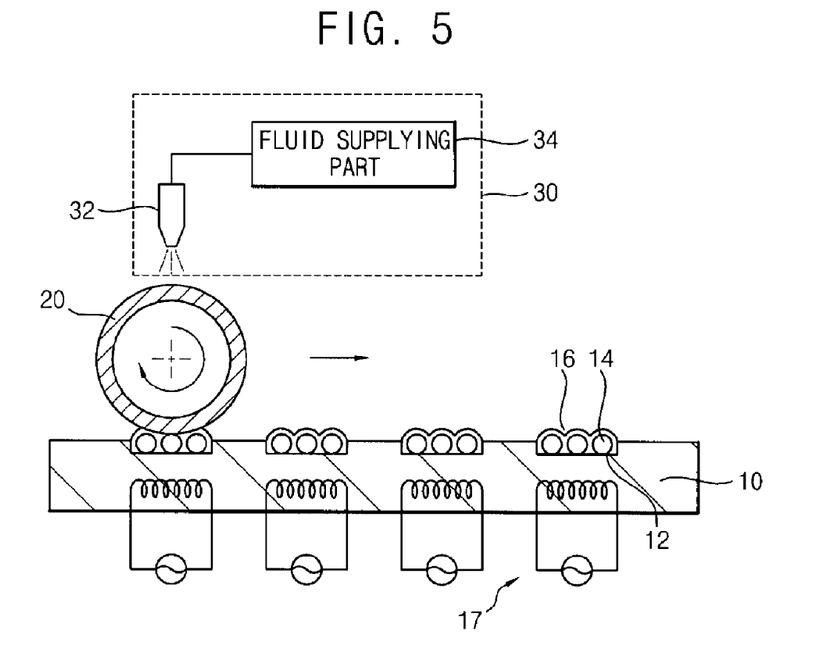
FIG. 5 is a cross-sectional view showing a heating part mounted on the apparatus for arranging the spacer shown in FIG. 1.

FIG. 5 is a cross-sectional view showing a heating part mounted on the apparatus for arranging the spacer shown in FIG. 1.

Referring to FIG. 5, in order to decrease the adhesive strength between the received portion 16b of the adhesive member 16 and the recessed portion 12, a heating part 17 may be included on the substrate 10. For example, the heating part 17 may be a heater having a heating coil that supplies heat to a portion of the substrate 10. The heating part 17 may include a plurality of heating coils and a plurality of power supplies electrically connected to the heating coils, respectively. The heating part 17 may be formed on a portion of the substrate 10 corresponding to the recessed portions 12. When the heating part 17 heats the recessed portions 12, the adhesive strength between the received portion 16b of the adhesive member 16 and the recessed portions 12 may decrease so that the spacer 14 in the recessed portion 12 may be printed on the roller 20.

Figure 6:
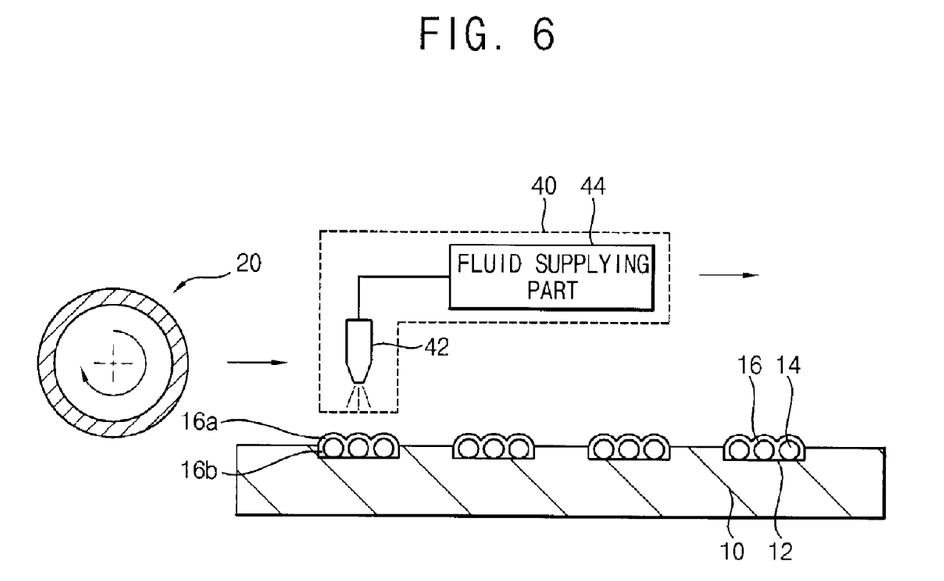
FIG. 6 is a cross-sectional view showing an apparatus for arranging a spacer in accordance with another exemplary embodiment of the present invention.

FIG. 6 is a cross-sectional view showing an apparatus for arranging a spacer in accordance with another exemplary embodiment of the present invention. The apparatus for arranging the spacer of FIG. 6 is the same as that in FIG. 1 except for an adhesion unit. Thus, the same reference numerals will be used to refer to the same or like parts as those described in FIGS. 1 to 5 and any further explanation will be omitted.

Referring to FIG. 6, the adhesion unit 40 increases an adhesive strength between a roller 20 and an exposed portion 16a of an adhesive member 16 so that the spacer 14 that is received in the recessed portion 12 may be printed on the roller 20. In particular, the adhesion unit 40 decreases a temperature of the exposed portion 16a of the adhesive member 16 so that the adhesive strength between the roller 20 and the exposed portion 16a of the adhesive member 16 may increase.

Here, the adhesion unit 40 includes a spraying part 42 and a fluid supplying part 44. For example, the spraying unit 42 may be an air knife. The fluid supplying part 44 may further include a cooler (not shown) that decreases a temperature of a fluid, such as an inert gas. Alternatively, the cooler (not shown) may be formed on the spraying part 42 or a conduit that connects the spraying part 42 and the fluid supplying part 44.

Examples of the inert gas that may be supplied by the fluid supplying part 44 include nitrogen, argon, helium, etc. They may be used alone or as a mixture thereof.

The fluid, such as the inert gas, from the fluid supplying part 44 is sprayed onto the exposed portion 16a of the adhesive member 16 so that a temperature of the exposed portion 16a is less than a temperature of the received portion 16b. A temperature difference between the exposed portion 16a and the received portion 16b may be about 5° C. to about 35° C.

When the inert gas decreases the surface temperature of the exposed portion 16a, the adhesive strength between the roller 20 and the exposed portion 16a may be greater than that between the recessed portion 12 and the received portion 16b so that the spacer 14 in the recessed portion 12 may be printed on the roller 20.

Figure 7:
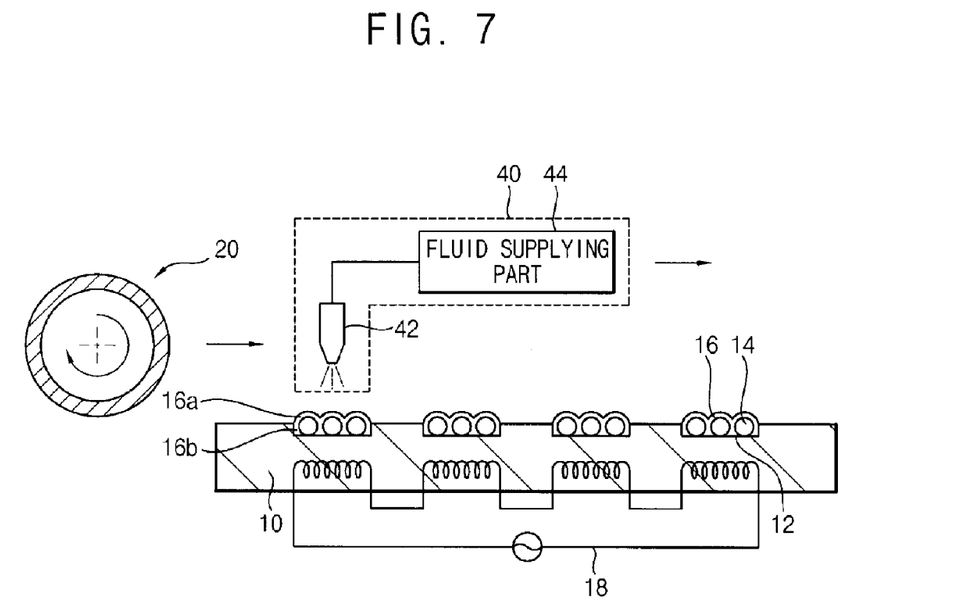
FIG. 7 is a cross-sectional view showing a heating part mounted on the apparatus for arranging the spacer shown in FIG. 6.

FIG. 7 is a cross-sectional view showing a heating part mounted on the apparatus for arranging the spacer shown in FIG. 6.

Referring to FIG. 7, in order to decrease the adhesive strength between a received portion 16b of an adhesive member 16 and the recessed portion 12, a heating part 18 may be included on a substrate 10. For example, the heating part 18 may be a heater having a heating coil that supplies heat to a portion of the substrate 10. The heating part 18 may include a plurality of heating coils and a single power supply electrically connected to the heating coils.

The heating part 18 may be formed on a portion of the substrate 10 corresponding to the recessed portions 12. When the heating part 18 heats the recessed portions 12, the adhesive strength between the received portion 16b of the adhesive member 16 and the recessed portions 12 may decrease so that the spacer 14 in the recessed portion 12 may be printed on the roller 20.

Figure 8:
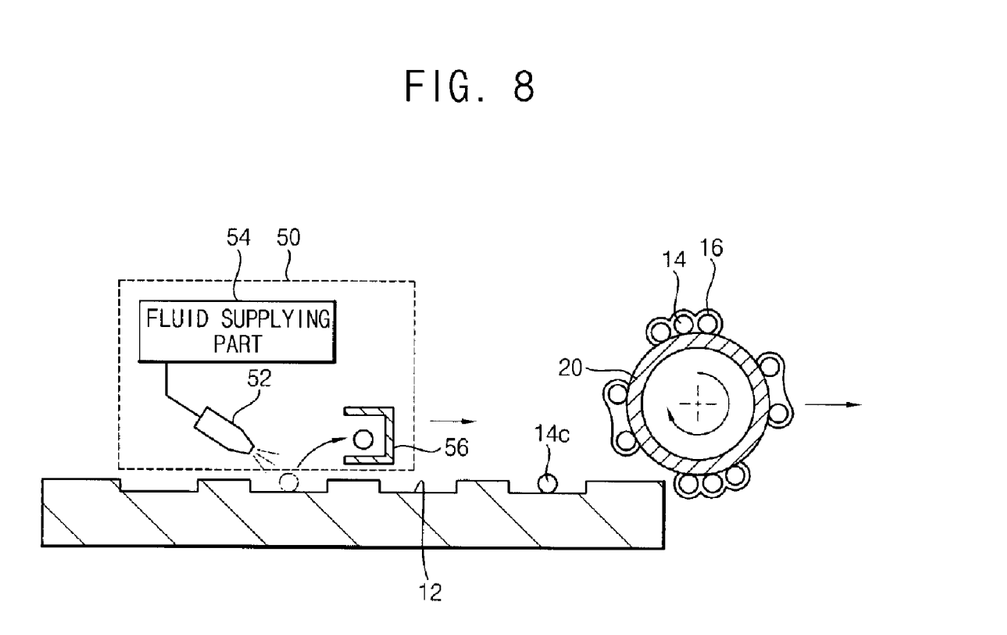
FIG. 8 is a cross-sectional view showing an apparatus for arranging a spacer in accordance with another exemplary embodiment of the present invention.

FIG. 8 is a cross-sectional view showing an apparatus for arranging a spacer in accordance with another exemplary embodiment of the present invention. The apparatus for arranging the spacer of FIG. 8 is the same as that in FIGS. 1 and 5 except for an adhesion unit. Thus, the same reference numerals will be used to refer to the same or like parts as those described in FIGS. 1 to 5 and any further explanation will be omitted.

Referring to FIG. 2 and FIG. 8, the adhesion unit further comprises a spacer cleaning part 50 to remove a remaining spacer 14c from recessed portions 12 of a substrate 10.

Particularly, when a spacer in a recessed portion 12 does not attach to a roller 20, that remaining spacer 14c remains in the recessed portion 12.

When the remaining spacer 14c is in the recessed portion 12, a new spacer 14 from a subsequent process may be attached on the remaining spacer 14c, and the remaining spacer 14c and the new spacer 14 may then be attached to the roller 20. In other words, the new spacer 14 may be stacked on the remaining spacer 14c. When the stacked remaining spacer 14c and new spacer 14 are attached to the roller 20, they may be printed on a display substrate (not shown), which decreases cell gap uniformity of a display panel (not shown) and deteriorates an image display quality of the display panel (not shown).

The spacer cleaning part 50 may include a cleaning part 52 and a fluid supplying part 54 that supplies the cleaning part 52 with a fluid. For example, the cleaning part 52 injects a cleaning gas such as an inert gas. Examples of the inert gas that may be injected through the cleaning part 52 include nitrogen, argon, helium, etc. They may be used alone or in a mixture thereof.

The fluid supplying part 54 supplies the cleaning part 52 with fluid, such as the cleaning gas. The cleaning part 52 removes the remaining spacer 14c from the recessed portion 12 to prevent stacking of the new spacer 14. The spacer cleaning part 50 may further include a gathering cover 56 adjacent to the cleaning part 52 so that the remaining spacer 14c may be removed and collected in the gathering cover 56.

In FIG. 8, the remaining spacer 14c is removed from the recessed portion 12 before the new spacer 14 is arranged in the recessed portion 12. Therefore, the stacking of the remaining spacer 14c and the new spacer 14 may be prevented, thereby increasing cell gap uniformity of the display panel.

Figure 9:
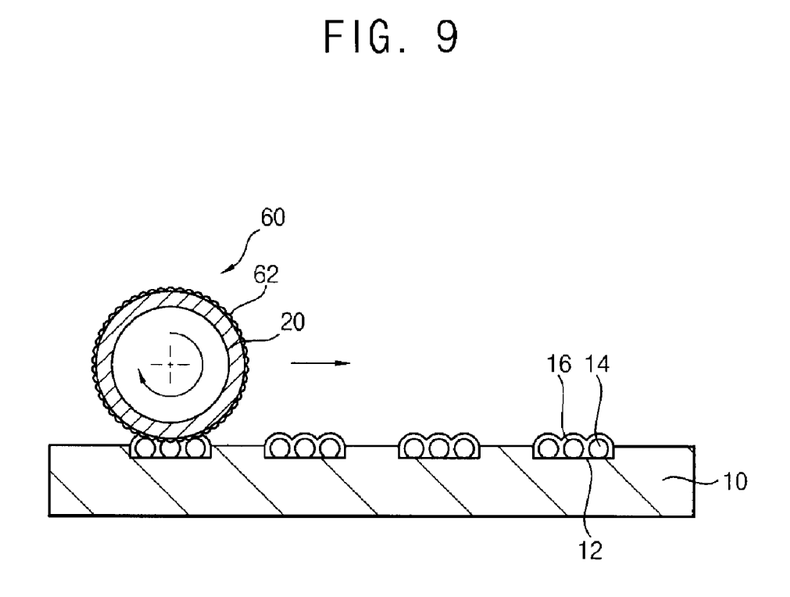
FIG. 9 is a cross-sectional view showing an apparatus for arranging a spacer in accordance with another exemplary embodiment of the present invention.

FIG. 9 is a cross-sectional view showing an apparatus for arranging a spacer in accordance with another exemplary embodiment of the present invention. The apparatus for arranging the spacer of FIG. 9 is the same as in FIG. 1 except for an adhesion unit. Thus, the same reference numerals will be used to refer to the same or like parts as those described in FIGS. 1 to 5 and any further explanation will be omitted.

Referring to FIG. 2 and FIG. 9, the adhesion unit 60 may include an embossed portion 62 on a roller 20.

When the embossed portion 62 is formed on the roller 20, a contact surface between an exposed portion 16a of an adhesive member 16 and the roller 20 may be greater than a contact surface between the received portion 16b of the adhesive member 16 and the recessed portion 12. Therefore, an adhesive strength between the exposed portion 16a and the roller 20 may be greater than an adhesive strength between the received portion 16b and the recessed portion 12 so that the spacer 14 may be printed on the embossed portion 62.

In FIG. 9, the embossed portion 62 increases an area of the contact surface between the exposed portion 16a and the roller 20 or the contact surface between the received portion 16b and the roller 20. Thus, the area of the contact surface between the exposed portion 16a and the roller 20 or the contact surface between the received portion 16b and the recessed portion 12 may be controlled so that the spacer 14 may be printed on the embossed portion 62.

Figure 10:
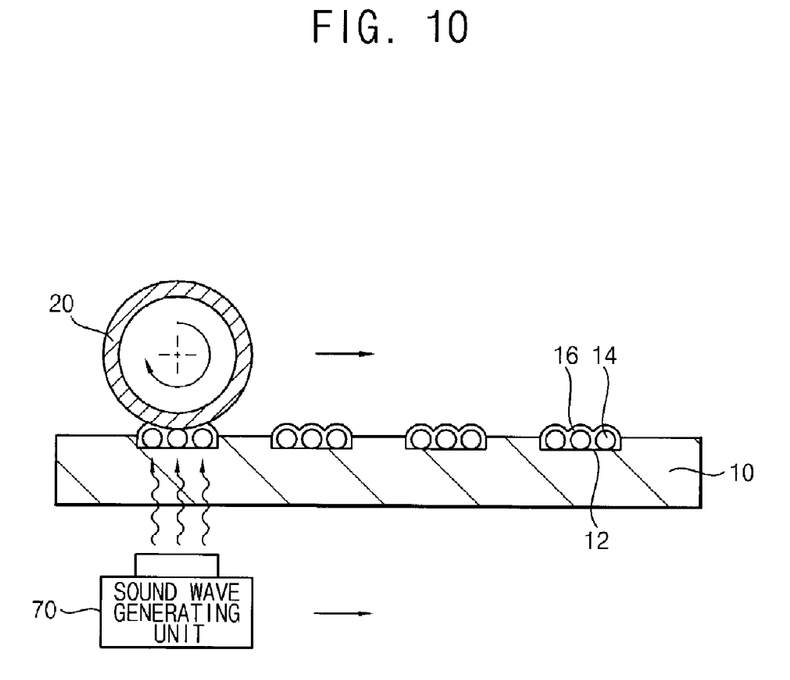
FIG. 10 is a cross-sectional view showing an apparatus for arranging a spacer in accordance with another exemplary embodiment of the present invention.

FIG. 10 is a cross-sectional view showing an apparatus for arranging a spacer in accordance with another exemplary embodiment of the present invention. The apparatus for arranging the spacer of FIG. 10 is the same as in FIG. 1 except for an adhesion unit. Thus, the same reference numerals will be used to refer to the same or like parts as those described in FIGS. 1 to 5 and any further explanation will be omitted.

Referring to FIG. 2 and FIG. 10, in order to print a spacer 14 that is received in the recessed portion 12 on a roller 20, an adhesion unit 70 may be arranged adjacent to the substrate 10. For example, the adhesion unit 70 may be a sound wave generating unit that generates a sonic wave to increase a fluidity of a received portion 16b in the recessed portion 12.

When irradiating sonic waves onto the received portion 16b of the adhesive member 16, the fluidity of the received portion 16b may increase, thereby decreasing an adhesive strength between the recessed portion 12 and the received portion 16b. Hence, an adhesive strength between the roller 20 and the exposed portion 16a may be stronger than the adhesive strength between the recessed portion 12 and the received portion 16b. Therefore, the spacer 14 may be printed on the roller 20.

In FIG. 10, the sonic waves are irradiated onto the recessed portion 12 of the substrate 10 to decrease the adhesive strength between the received portion 16b of the adhesive member 16 and the recessed portion 12 so that the spacer 14 may be printed on the roller 20.

Figure 11:
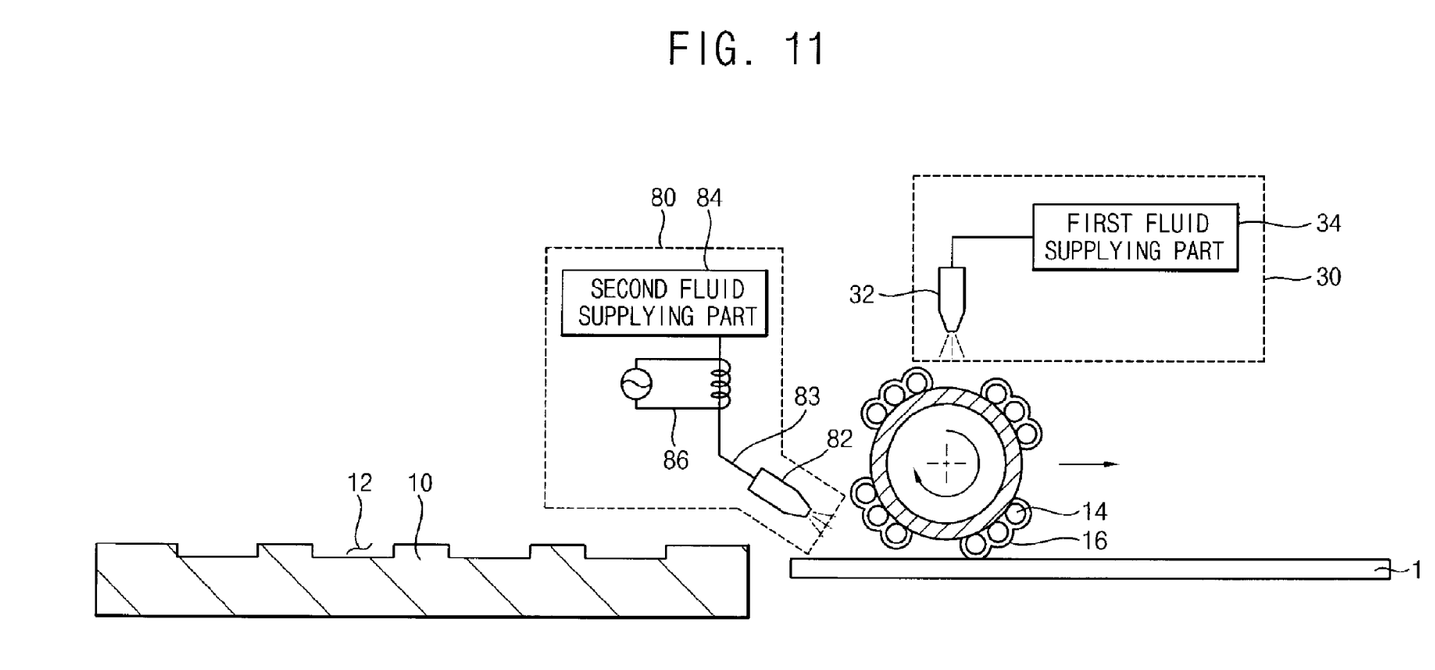
FIG. 11 is a cross-sectional view showing an apparatus for arranging a spacer in accordance with another exemplary embodiment of the present invention.

FIG. 11 is a cross-sectional view showing an apparatus for arranging a spacer in accordance with another exemplary embodiment of the present invention. The apparatus for arranging the spacer of FIG. 11 is the same as that in FIG. 1 except for a roller. Thus, the same reference numerals will be used to refer to the same or like parts as those described in FIGS. 1 to 5 and any further explanation will be omitted.

Referring to FIG. 2 and FIG. 11, the roller 20 may further include a spacer separating unit 80.

When an adhesive strength between an exposed portion 16a of an adhesive member 16 that is attached to the roller 20 is greater than an adhesive strength between a display substrate 1 and a received portion 16b of the adhesive member 16, a spacer 14 may not be printed on a display substrate 1. In other words, the spacer 14 may remain on the roller 20.

In FIG. 11, the roller 20 further includes the spacer separating unit 80 so that a spacer 14 that is printed on the roller 20 may be printed on the display substrate 1.

The spacer separating unit 80 includes a second spraying part 82, a second fluid supplying part 84, and a heating part 86.

The second spraying part 82 sprays a fluid from the second fluid supplying part 84 toward an interface between the adhesive member 16 and the roller 20. The fluid from the second fluid supplying part 84 may be an inert gas. The heating part 86 may heat the fluid from the second fluid supplying part 84 so that its temperature is no less than that of the adhesive member 16. The heating part 86 may be a heater having a heating coil that is on a conduit 83, which connects the second fluid supplying part 84 and the second spraying part 82. Alternatively, the heating part 86 may be in the second fluid supplying part 84, and it may also be on the spraying part 82.

The fluid is sprayed from the spraying part 82 toward the interface between the adhesive member 16 and the roller 20 so that the adhesive strength between the adhesive member 16 and the roller 20 may decrease. Therefore, the spacer 14 that is attached on the roller 20 may be printed on the display substrate 1.

In FIG. 11, the spacer separating unit 80 heats the adhesive member 16 that is attached to the roller 20. Alternatively, the spacer separating unit 80 may be in the roller 20. Furthermore, the spacer separating unit 80 may be a cooler adjacent to the display substrate 1 so that a temperature of the display substrate 1 may be lower than that of the adhesive member 16.

Figure 12:
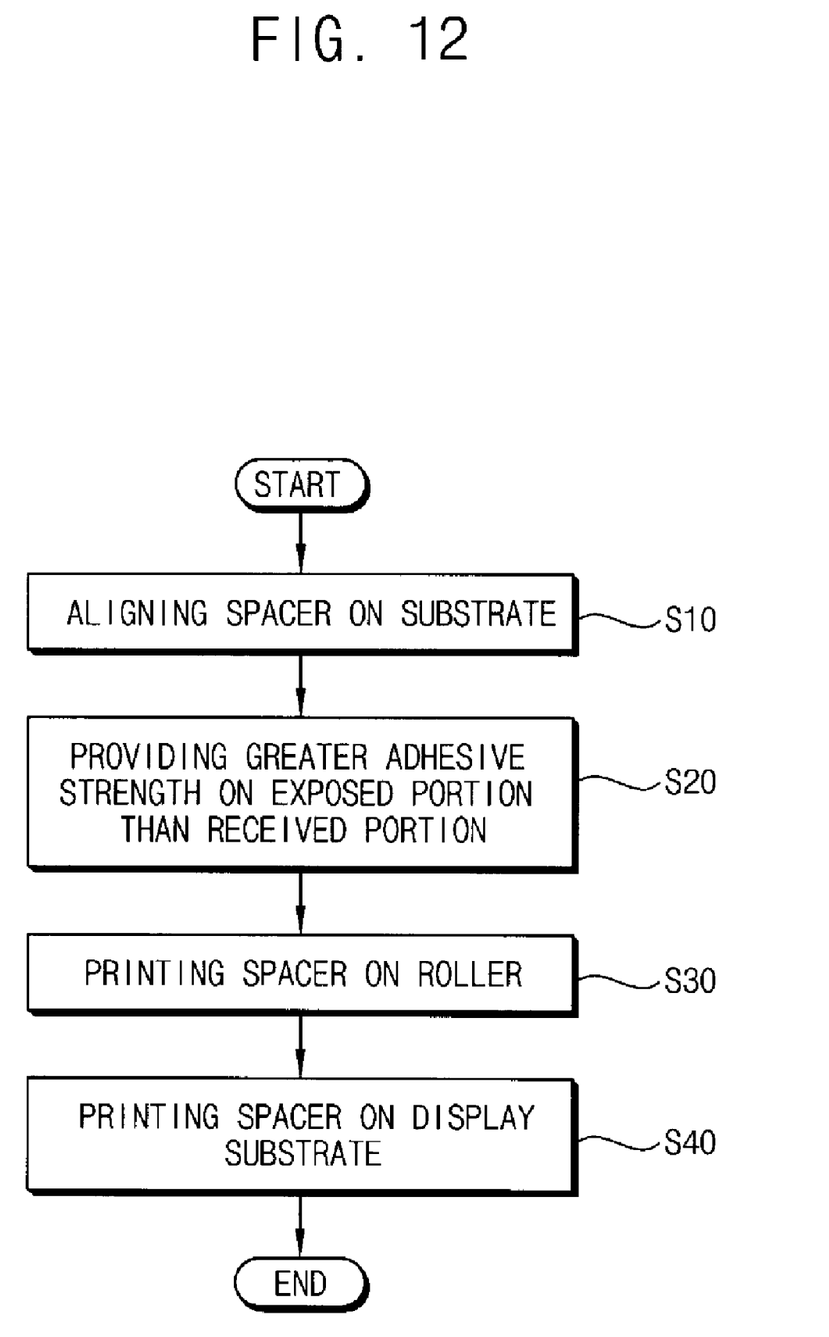
FIG. 12 is a flow chart showing a method for arranging a spacer in accordance with an exemplary embodiment of the present invention.
Figure 13:
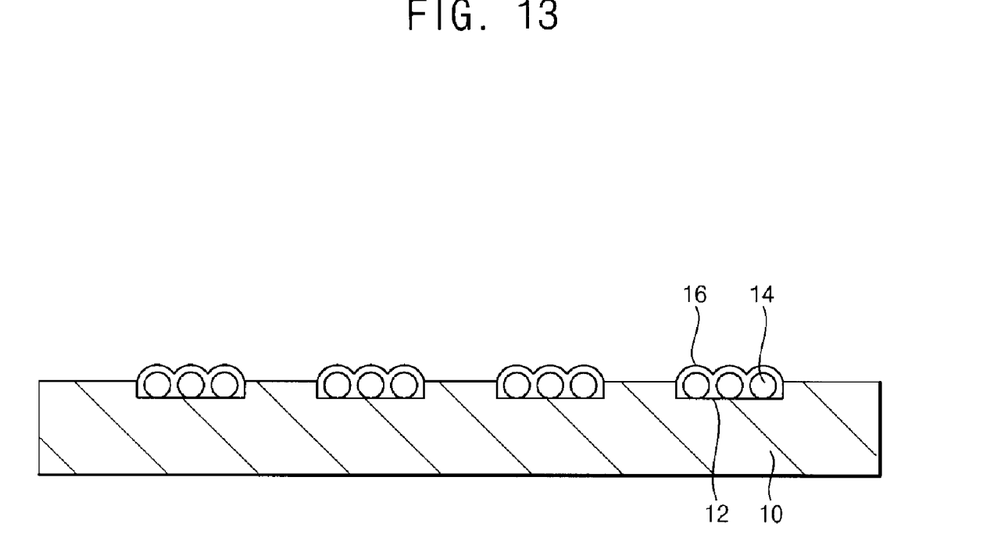
FIG. 13 is a cross-sectional view showing a spacer and an adhesive member in a recessed portion of a substrate in accordance with an exemplary embodiment of the present invention.

FIG. 12 is a flow chart showing a method for arranging a spacer in accordance with an exemplary embodiment of the present invention. FIG. 13 is a cross-sectional view showing a spacer and an adhesive member in a recessed portion of a substrate in accordance with an exemplary embodiment of the present invention.

Referring to FIG. 12 and FIG. 13, a spacer 14 is aligned on a substrate 10 having a recessed portion 12 (step S10). An adhesive member 16 is formed on the spacer 14. The spacer 14 having the adhesive member 16 is received in the recessed portion 12 using a scraper (not shown). In FIGS. 12 and 13, a plurality of spacers 14 may be received in the recessed portion 12.

Figure 14:
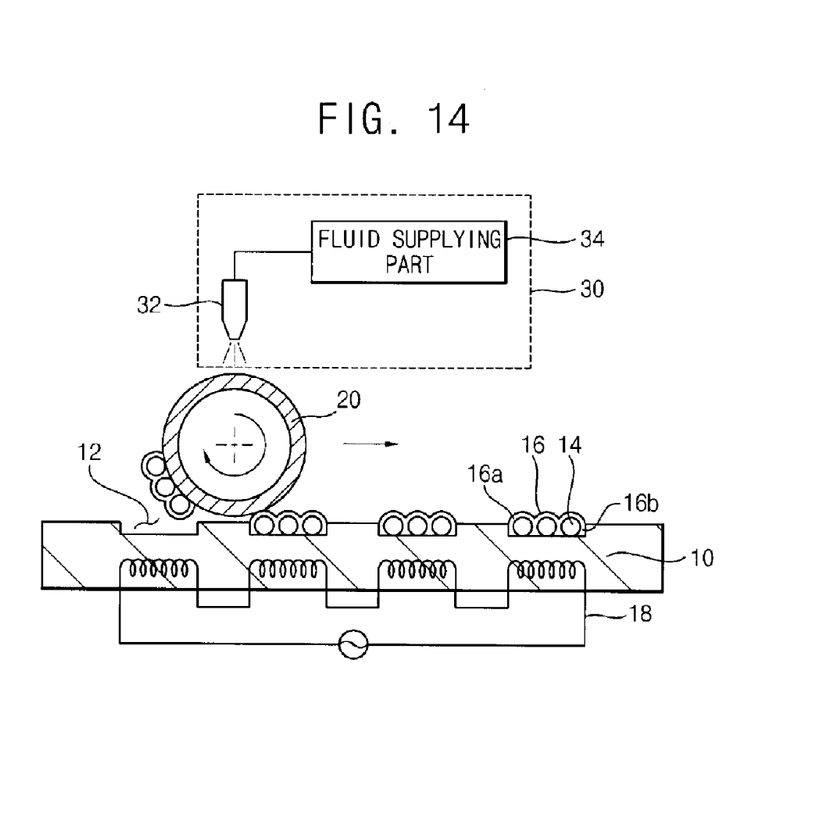
FIG. 14 is a cross-sectional view showing printing of the spacer of FIG. 13 on a roller.

FIG. 14 is a cross-sectional view showing printing of the spacer of FIG. 13 on a roller.

Referring to FIG. 12 and FIG. 14, an adhesive strength between the exposed portion of the adhesive member and the roller that is stronger than an adhesive strength between the received portion of the adhesive member and the recessed portion of the substrate is provided (step S20). That is, the adhesive strength between the exposed portion 16a of the adhesive member 16 and the roller 20 may be increased so that it exceeds an adhesive strength between a received portion 16b of the adhesive member 16 and the recessed portion 12, and/or the adhesive strength between the recessed portion 12 and the received portion 16b may be decreased so that it is less than the adhesive strength between the roller 20 and the exposed portion 16a.

In order to increase the adhesive strength between the exposed portion 16a of the adhesive member 16 and the roller 20, a coolant may be sprayed on the roller 20 through a cooling part of a fluid supplying part 34.

After the adhesive unit 30 cools the roller 20, the roller 20 makes contact with the adhesive member 16 in the recessed portion 12. The adhesive strength between the exposed portion 16a of the adhesive member 16 and the roller 20 may be greater than an adhesive strength between a received portion 16b of the adhesive member 16 and the recessed portion 12 so that the spacer 14 in the recessed portion 12 may be printed on the roller 20 (step S30). In FIG. 14, the coolant is sprayed on the roller 20. Alternatively, the coolant may be sprayed on the exposed portion 16a of the adhesive member 16. Further, a sonic wave may be irradiated onto the received portion 16b of the adhesive member 16 so that the spacer 14 in the recessed portion 12 may be printed on the roller 20. Furthermore, a first heating part 18 may heat the substrate 10 so that the adhesive strength between a received portion 16b of the adhesive member 16 and the recessed portion 12 may decrease.

Figure 15:
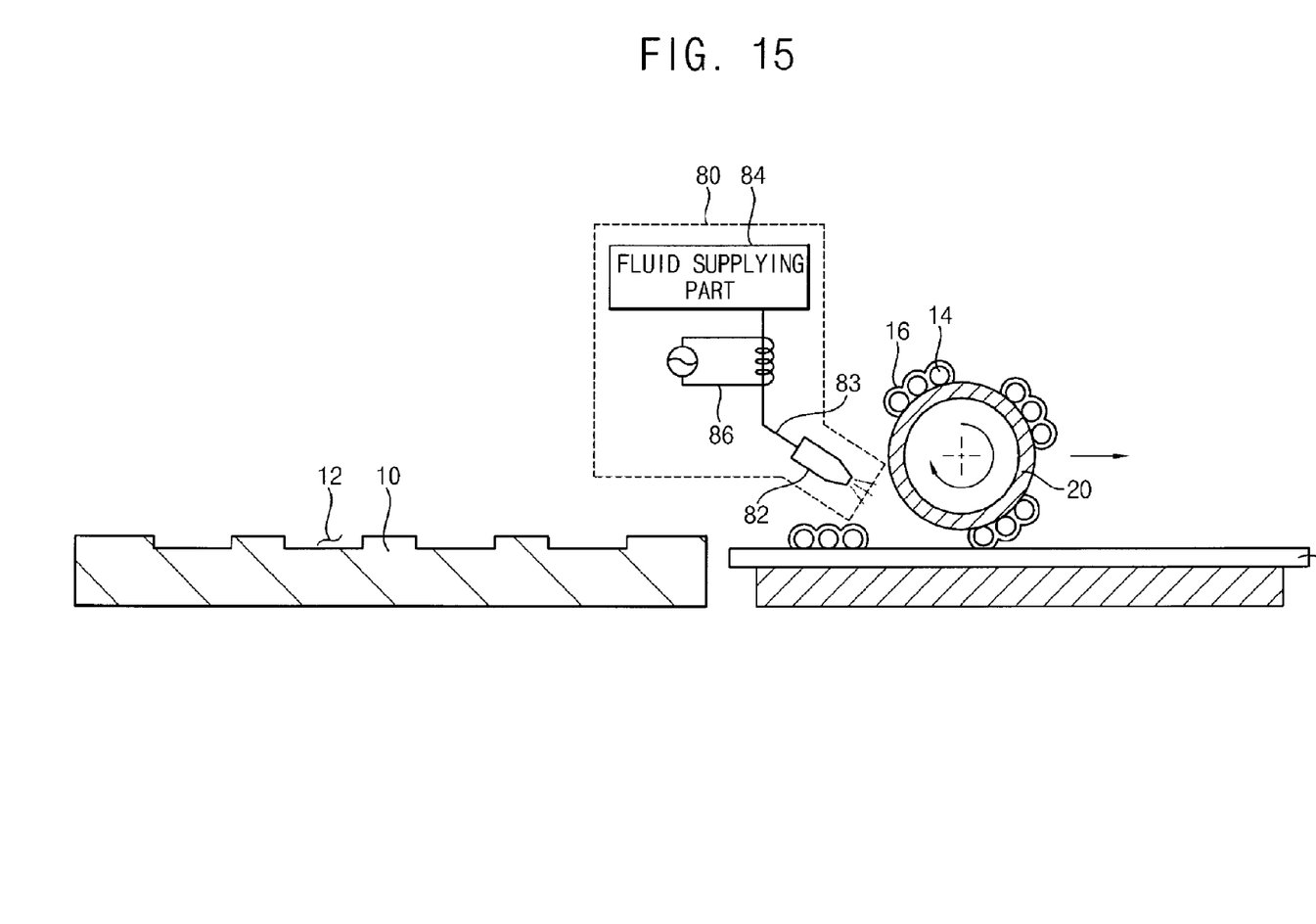
FIG. 15 is a cross-sectional view showing printing of the spacer of FIG. 14 on a display substrate.

FIG. 15 is a cross-sectional view showing printing of the spacer of FIG. 14 on a display substrate.

Referring to FIG. 12 and FIG. 15, the roller 20 including the spacer 14 is transported on a display substrate 1. The adhesive member 16 on the spacer 14 makes contact with the display substrate 1 so that the spacer 14 and the adhesive member 16 may be printed on the display substrate 1 (step S40).

When the adhesive strength between the roller 20 and the exposed portion 16a of the adhesive member 16 is greater than an adhesive strength between the display substrate 1 and the received portion 16b of the adhesive member 16, the spacer 14 that is on the roller 20 may not be printed on the display substrate 1.

Therefore, in order to decrease the adhesive strength between the roller 20 and the exposed portion 16a, a fluid that is heated by a second heating part 86 of a spacer separating unit 80 may be sprayed on the adhesive member 16 that is attached to the roller 20. Therefore, the adhesive strength between the roller 20 and the adhesive member 16 attached to the roller 20 may be decreased so that the spacer 14 may be printed on the display substrate 1.

In FIG. 15, the adhesive member 16 attached to the roller 20 is heated so that the spacer 14 may be printed on the display substrate 1. Alternatively, a temperature of the display substrate 1 may be decreased so that the spacer 14 attached to the roller 20 may be printed on the display substrate 1. Further, a sonic wave may be irradiated onto the adhesive member 16 so that the spacer 14 attached to the roller 20 may be printed on the display substrate 1.

Figure 16:
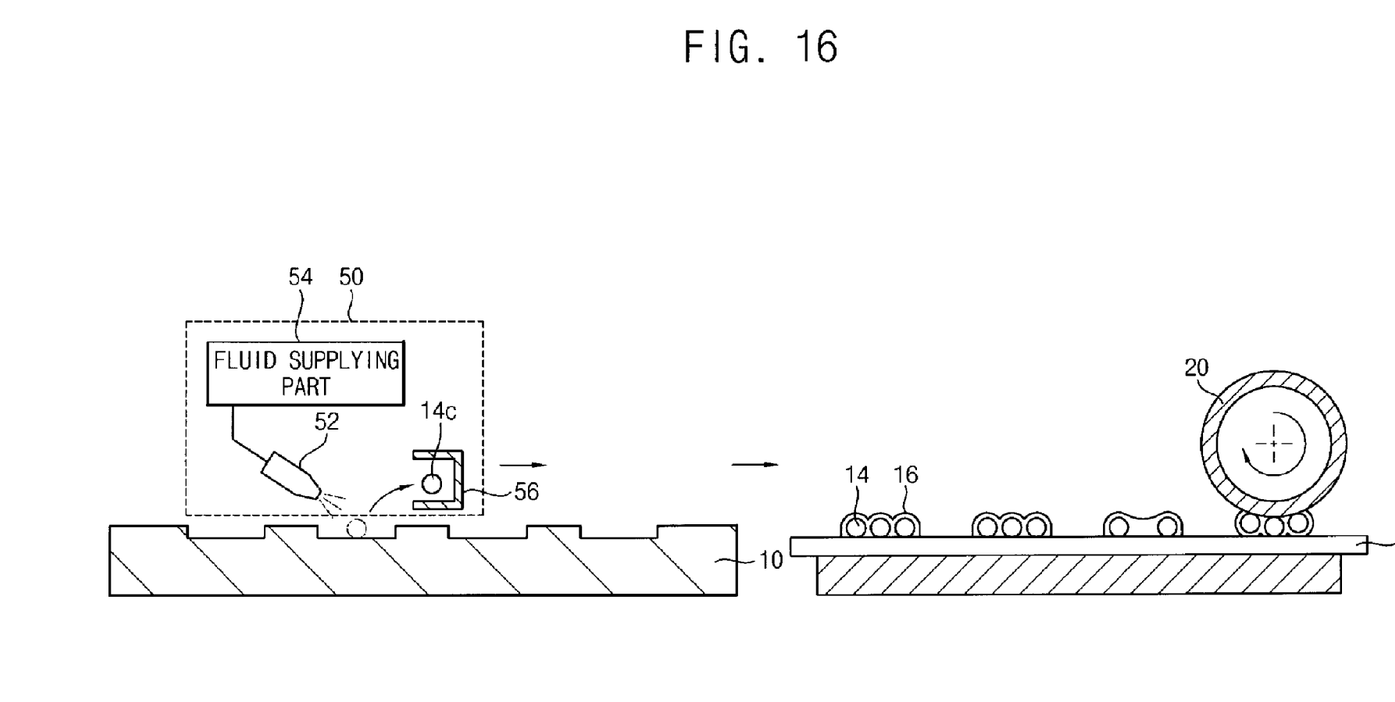
FIG. 16 is a cross-sectional view showing removing a spacer remaining in the recessed portion of the substrate shown in FIG. 13.

FIG. 16 is a cross-sectional view showing removing a spacer remaining in the recessed portion of the substrate shown in FIG. 13.

Referring to FIG. 16, after the spacer 14 is printed on the roller 20, a remaining spacer 14c that remains in the recessed portion 12 may be removed. A cleaning part 52 of the spacer cleaning part 50 sprays a cleaning gas on the substrate 10 so that the remaining spacer 14c may be removed from the recessed portion 12. Therefore, a new spacer 14 may not be stacked on the remaining spacer 14c.

According to exemplary embodiments of the present invention, the spacer may be easily printed between display panel substrates so that the cell gap uniformity of the display device may be improved.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An apparatus for arranging a spacer that maintains a cell gap of a display panel, comprising:
   a substrate comprising a recessed portion capable of receiving a spacer having an adhesive member formed thereon, the adhesive member comprising an exposed portion and a received portion;
   a roller corresponding to the spacer, the roller to adhere with the exposed portion of the adhesive member; and
   an adhesion unit that provides for an adhesive strength between the exposed portion of the adhesive member and the roller that exceeds an adhesive strength between the received portion of the adhesive member and the recessed portion of the substrate so that the spacer is printed on the roller.

2. The apparatus of claim 1, wherein the adhesion unit comprises:
   a spraying part that sprays a coolant on the roller so that a temperature of the roller is decreased; and
   a coolant supplying part that supplies the spraying part with the coolant.

3. The apparatus of claim 2, wherein the coolant comprises an inert gas.

4. The apparatus of claim 2, wherein a temperature of the recessed portion is greater than a temperature of the roller.

5. The apparatus of claim 4, wherein the temperature of the recessed portion is greater than the temperature of the roller by about 5° C. to about 35° C.

6. The apparatus of claim 2, wherein the substrate further comprises a heater to heat the received portion of the adhesive member.

7. The apparatus of claim 1, wherein the adhesion unit comprises a spraying part that sprays a coolant on the exposed portion of the adhesive member.

8. The apparatus of claim 7, wherein the exposed portion is cooled by the coolant so that a temperature of the received portion is greater than a temperature of the exposed portion.

9. The apparatus of claim 8, wherein the temperature of the received portion is greater than the temperature of the exposed portion by about 5° C. to about 35° C.

10. The apparatus of claim 7, wherein the substrate further comprises a heater to heat the received portion of the adhesive member.

11. The apparatus of claim 1, wherein the adhesion unit comprises a spacer cleaning part to remove a remaining spacer that is not attached to the roller and remains in the recessed portion.

12. The apparatus of claim 11, wherein the spacer cleaning part comprises a cleaning part that sprays a cleaning fluid on the remaining spacer to remove the remaining spacer from the recessed portion.

13. The apparatus of claim 12, wherein the spacer cleaning part further comprises a gathering cover to gather the remaining spacer that is removed from the recessed portion.

14. The apparatus of claim 1, wherein the adhesion unit comprises an embossed portion to increase a contact surface between the roller and the exposed portion of the adhesive member.

15. The apparatus of claim 1, wherein the adhesion unit comprises a sound wave generating part to transmit a sonic wave to the received portion of the adhesive member.

16. The apparatus of claim 1, wherein a portion of the spacer protrudes from the recessed portion of the substrate.

17. The apparatus of claim 1, wherein the roller further comprises a spacer separating unit, the spacer separating unit comprising:
   a spraying part that sprays a fluid toward an interface of the exposed portion of the adhesive member and the roller so that the exposed portion that is attached to the roller is separated from the roller;
   a fluid supplying part to supply the spraying part with the fluid; and
   a heating part to heat the fluid so that a temperature of the fluid is higher than a temperature of the adhesive member.

* * * * *